United States Patent [19]

Matsumoto

[11] Patent Number: 5,043,742

[45] Date of Patent: Aug. 27, 1991

[54] CORRECTION OF PRINTING SIGNAL TO BE SUPPLIED TO THERMAL HEAD OF THERMAL PRINTER

[75] Inventor: Tomohiko Matsumoto, Iwai, Japan

[73] Assignee: Victor Company of Japan, Ltd., Japan

[21] Appl. No.: 476,905

[22] Filed: Feb. 8, 1990

[30] Foreign Application Priority Data

Feb. 9, 1989 [JP] Japan .................................. 1-30722
Apr. 28, 1989 [JP] Japan .................................. 1-110294
Aug. 8, 1989 [JP] Japan .................................. 1-205008

[51] Int. Cl.[5] .......................................... G01D 15/10

[52] U.S. Cl. .......................... 346/76 PH; 346/1.1

[58] Field of Search ..................... 346/76 PH, 1.1

[56] References Cited

U.S. PATENT DOCUMENTS 4,514,738 4/1985 Nagato et al. .
4,536,774 8/1985 Inui et al. .
4,567,488 1/1986 Moriguchi et al. ............ 346/76 PH
4,574,293 3/1986 Inui et al. ....................... 346/76 PH
4,587,530 5/1986 Noguchi ........................ 346/76 PH
4,607,262 8/1986 Moriguchi et al. ............ 346/76 PH
4,633,269 12/1986 Mikami et al. ................. 346/76 PH
4,679,055 7/1987 Inui et al. ................... 346/76 PH X
4,723,132 2/1988 Matsuo ....................... 346/76 PH X
4,827,281 5/1989 Lubinsky et al. .......... 346/76 PH X

FOREIGN PATENT DOCUMENTS 59-98878 6/1984 Japan .
63-306058 12/1988 Japan .
140356 2/1989 Japan .

*Primary Examiner*—Benjamin R. Fuller
*Assistant Examiner*—Randy W. Gibson
*Attorney, Agent, or Firm*—Lowe, Price, LeBlanc & Becker

[57] ABSTRACT

A data correction apparatus corrects a printing data signal to be supplied to a thermal printer having a printing head constructed with heating elements aligned in a main scanning direction. The data correction apparatus includes an estimation circuit for estimating a thermal state of the print head supplied with the printing data signal. The estimation circuit includes an integration circuit for integrating the printing data signal corresponding to each of a plurality of dots to be printed by the print head, and an equalizing circuit for averaging an output of the integration circuit in one main scanning period and for equalizing an output level of the integration circuit to a level of the averaging result. Also included in the data correction apparatus is a correction circuit in which a level of the printing data signal is corrected in response to an output of the estimation circuits.

2 Claims, 12 Drawing Sheets

INPUT PRINTING DATA SIGNAL

OUTPUT OF FIRST SIGNAL PROCESSING CKT

OUTPUT OF FIRST MEMORY

OUTPUT OF SECOND MEMORY

OUTPUT OF SECOND SIGNAL PROCESSING CKT

OUTPUT OF ADDER

LINE ADDRESS

| COLUMN ADDRESS | - | 8 | 9 | 10 | 11 | - |
|---|---|---|---|---|---|---|
| - | - | 1 | 1 | 1 | 1 | - |
| 4 | - | 1 | 1 | 1 | 1 | - |
| 5 | - | 1 | 1 | 1 | 1 | - |
| 6 | - | 1 | 1 | 1 | 1 | - |
| 7 | - | 1 | 1 | 1 | 2 | - |
| 8 | - | 1 | 1 | 2 | 2 | - |
| - | - | - | - | - | - | - |

LINE ADDRESS

| COLUMN ADDRESS | - | 8 | 9 | 10 | 11 | - |
|---|---|---|---|---|---|---|
| - | - | - | - | - | - | - |
| 4 | - | 0.0 | 0.1 | 0.3 | 0.5 | - |
| 5 | - | 0.1 | 0.2 | 0.4 | 0.7 | - |
| 6 | - | 0.2 | 0.3 | 0.6 | 0.9 | - |
| 7 | - | 0.4 | 0.6 | 0.8 | 0.0 | - |
| 8 | - | 0.5 | 0.7 | 0.0 | 0.2 | - |
| - | - | - | - | - | - | - |

CORRECTION OF PRINTING SIGNAL TO BE SUPPLIED TO THERMAL HEAD OF THERMAL PRINTER

BACKGROUND OF THE INVENTION

The present invention relates generally to thermal printing apparatus, and more particularly to an apparatus for correcting a printing data signal to be applied to each of heating elements of a thermal printer, in accordance with a thermal state of each heating element.

In recent years, a number of printers as so-called thermal printer have been developed. With respect to quality of a printed image, most important of these is a printer of the type that printing ink is transferred from an ink sheet to a printing medium by sublimation, in response to heat generated by supplied currents to a print head.

This type of the thermal printer is generally equipped with a print head constructed with heating elements aligned in a main scanning direction. (N.B. A main direction means a transverse direction of the printing medium; meanwhile, a secondary direction means a longitudinal direction of the printing medium.) When a stepwise current is supplied to each of the plurality of heating elements, the temperature of the heating element increases with time delay and this approximates the integration of the input current. That is, the inclination of the temperature of the heating element per unit of time principally depends upon the heat capacity of the heating element and its final value results in being a temperature due to balance between the heat quantity generated by the supply current and the heat quantity running away into the circumference. Accordingly, the integration effect greatly depends upon the structure of the thermal head with the resistance heating elements.

Generally, the time-delay of increase in the temperature of the resistance heating element with respect to the current, i.e., a drive signal, is unavoidable whereby difficulty is encountered to accurately obtain a desirable printing density. As one of techniques for eliminating this printing density problem has been proposed the so-called differentiation correction which cancels the integration effect of the print head by differentiating the input signal to the print head.

For example, in the case of printing an image corresponding to an original image as illustrated in FIG. 1 with a print head having a number of heating elements which are successively arranged in the main scanning direction (traverase direction of the recording medium), a signal produced due to the original image is as illustrated in FIG. 2. In FIGS. 1 and 2, numerals (32 to 256) respectively represent the degrees of densities. If directly applying the signal shown in FIG. 2 to the thermal head, the temperature of the thermal head, i.e., printing density, results the example as shown in FIG. 3 due to the integration effect and does not correspond the original image. Thus, if performing the differentiation correction with a time constant corresponding to the integration effect so as to effecting printing with a waveform as illustrated in FIG. 4, the original image can be reproduced as shown in FIG. 5.

In the aforementioned print head with linearly arranged heating elements, the number of the heating elements reaches, for example, 4096 (400 dots per inch) to cause the size of the print head to become considerably large, and therefore the thermal integration effect, or integration time constant, becomes great. The results of the case of applying a drive signal shorter than the integration time constant will be described hereinbelow with reference to FIGS. 6A to 7B.

If applying a drive signal longer than the integration time constant as illustrated in FIG. 6A, the signal results the waveform as shown in FIG. 6B due to the differentiation correction. Here, at a point a where the printing data signal varies from the high-density state to the low-density state, the temperature of the print head enters into the above-mentioned balanced state. On the other hand, if effecting the differential correction with respect to a signal shorter than the integration time constant as shown in FIG. 7A, the signal results the waveform as shown in FIG. 7B. In this case, at a point a varying from the high-density state to the low-density state, the temperature of the print head does not reach the balanced state and is lower than the temperature corresponding to the point a in FIGS. 6A and 6B. Thus, when effecting the correction similar to the correction made for the FIG. 6A signal, the correction for the low-density portion (edge portion) immediately after the high-density portion becomes excessive so that the density undesirably becomes low. Therefore, it is difficult to reproduce the original image accurately.

The temperature of a given point of the heating element is determined through the balance between the heat quantity generated at the point and the heat quantity lost from the point, and the flow of heat depends upon the heat conductivity of the material at the point and further the temperature difference between the temperature at the point and the temperature at the circumference of the point. Thus, even if supplying the same current to a given heating element, the temperature at the point varies in accordance with the temperature of the circumference of the point, and the temperature at the time of supplying current to a heating element depends on the heat quantity reserved at the point and the circumference, that is, the temperature varies in accordance with the drive signal previously applied.

Although the above description has been made with respect to the secondary scanning direction, the following description is for the main scanning direction. FIG. 8 is an illustration of an original image 3 in which the center portion 1 corresponds to a high density and the circumferential portion 2 corresponds to a low density, and FIG. 9 is an illustration of an printing result obtained by effecting the above-mentioned differential correction with respect to a signal derived from the FIG. 8 original image, In FIG. 9, reference 1' designates a region corresponds to the center portion 1 in FIG. 8 and the portion 1' is reproduced with the same density as the FIG. 8 center portion 1, and references 4*d* and 4*e* represent correction-exceeding portions as described with reference to FIG. 7B and the portions 4*d* and 4*e* result in becoming lower densities as compared with the portion 2 in FIG. 8. In printing of the region 1', of all the heating elements arranged in the main scanning direction, the heating elements corresponding to the width of the region 1' generate higher heat for the high-density printing as compared with the other heating elements. However, the left and right boundary portions of the higher-heat region tend to cause the heat to be lost due to the temperature difference, and hence the the heat quantity to be lost is more as compared with that of the center portion of the higher-heat region, thereby relatively lowering the temperature of the left and right boundary portions so as to result in the excessive correction over a wide range. Moreover, the temperature of a region 2′ contacting with the region 1′ becomes high due to the heat from the region 1′, thereby printing portions 4*b*, 4*c* whose densities are higher than that of the original image. Here, the reason that the portions 4*b*, 4*c* are expanded in the secondary scanning direction is that heat is reserved with the passage of time.

Thus, a further improvement is required from the viewpoint of more adequately effecting the correction with respect to the drive signal to the thermal head.

SUMMARY OF THE INVENTION

It is therefore an object of the present invention to provide a correction apparatus which is capable of adequately correcting an input printing data signal to be supplied to a thermal head in a print printer, in accordance with the thermal state of the heating element.

A feature of the present invention is to simulate the reserve state of heat generated by the previous application of a drive signal to the heat element so as to correct the current printing data signal on the basis of the estimation result.

Another feature of the present invention is to simulate the thermal affection between the heating elements arranged in the main scanning direction, on the basis of the drive signals to the heating elements for one printing line so as to correct the drive signal to each of the heating elements.

A further feature of the present invention is to effect the drive signal correction with an accuracy higher than the accuracy obtained with the calculation bit number.

In accordance with the present invention, there is provided a data correction apparatus for correcting a printing data signal to be supplied to a thermal printer having a printing head constructed with heating elements aligned in a main scanning direction, comprising: estimation means for estimating a thermal state of said print head being supplied with said printing data signal, including, integration means for integrating said printing data signal corresponding to each of dots to be printed by said print head, and equalizing means for averaging an output of said integration means in one main scanning period and for equalizing an output level of said integration means to a level of said averaging result; and correction means for correcting a level of said printing data signal in response to an output of said estimation means.

Preferably, the estimation means further includes a pre-correction means to correct beforehand said printing data signal inputted to said integration means, and said pre-correction means comprising: first data processing means for integrating said printing data signal successively in one direction on a time axis; and second data processing means for integrating said printing data signal successuvely in the reverse direction on the time axis; and third data processing means for averaging outputs of said first and second processing means.

In accordance with the present invention, there is further provided a correction apparatus for correcting a printing data signal to be supplied to a print head in a thermal printer, in response to a reference signal indicative of a thermal state of the print head simulated by the printing data signal, comprising: first correction means for correcting said printing data signal in response to a portion above the decimal point of said reference signal; second correction means for correcting said printing data signal in response to a portion below the decimal point of said reference signal; first adder means for accumulating an output of said second correction means and for outputting an extra signal every carry; and second adder means for adding outputs of said first correction means and said first adder means and for outputting a result of the addition as a corrected printing data signal.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
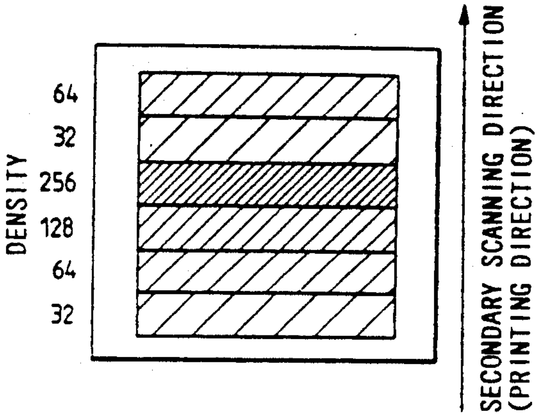
FIG. 1 PRIOR ART
FIG. 1 is an illustration of an image which different densities.
Figure 2:
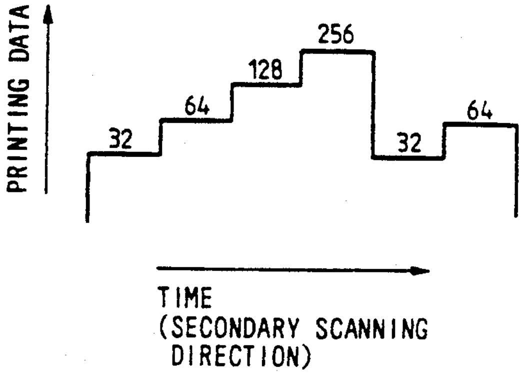
FIG. 2 PRIOR ART
FIG. 2 is an illustration of an printing data signal corresponding to the image illustrated in FIG. 1.
Figure 3:
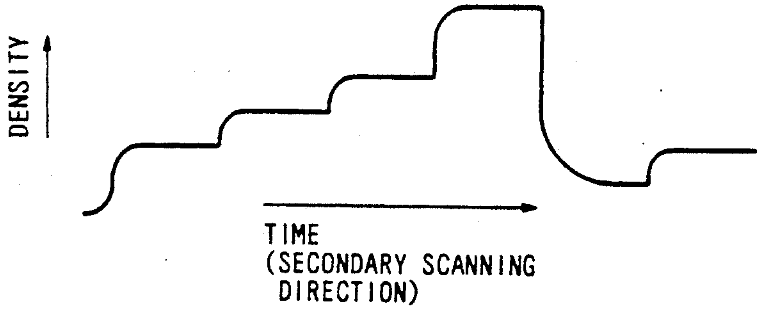
FIG. 3 PRIOR ART
FIG. 3 to 5 are illustrations for describing an prior art technique.
Figure 4:
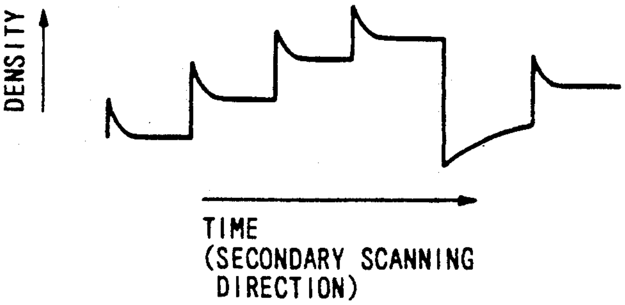
FIG. 4 PRIOR ART
Figure 5:
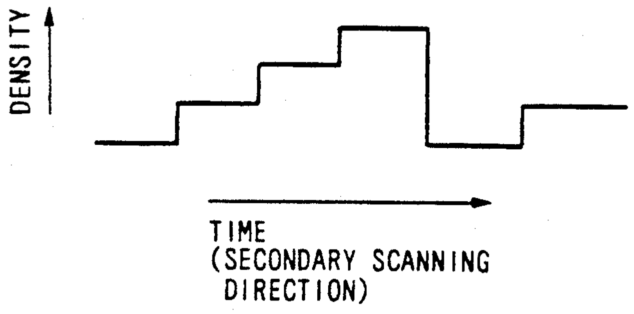
FIG. 5 PRIOR ART
Figure 6A:
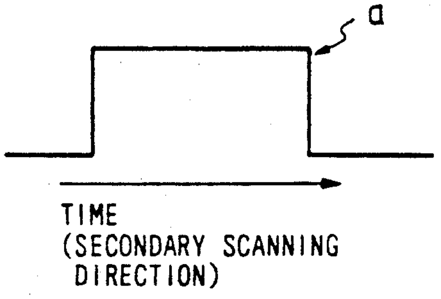
FIG. 6A PRIOR ART
FIGS. 6A to 7B are waveform diagrams for describing the prior art technique.
Figure 6B:
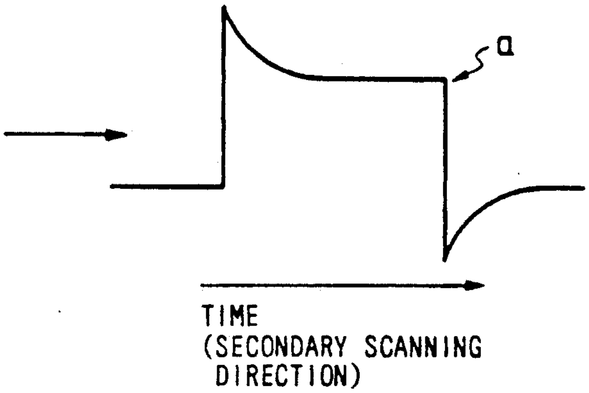
FIG. 6B PRIOR ART
Figure 7A:
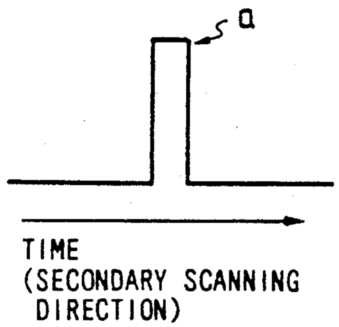
FIG. 7A PRIOR ART
Figure 7B:
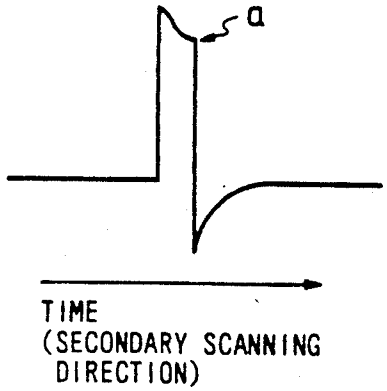
FIG. 7B PRIOR ART
Figure 8:
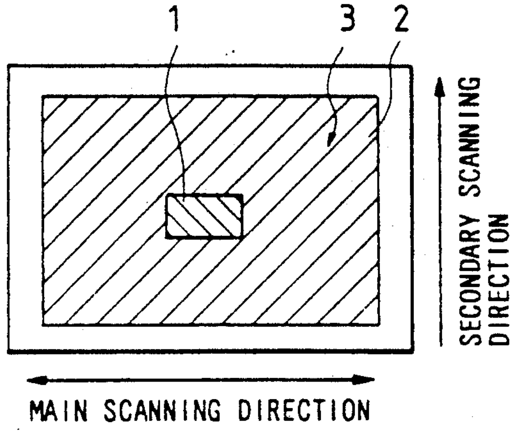
FIG. 8 PRIOR ART
FIGS. 8 and 9 are illustrations for describing an disadvantage to the prior art technique.
Figure 9:
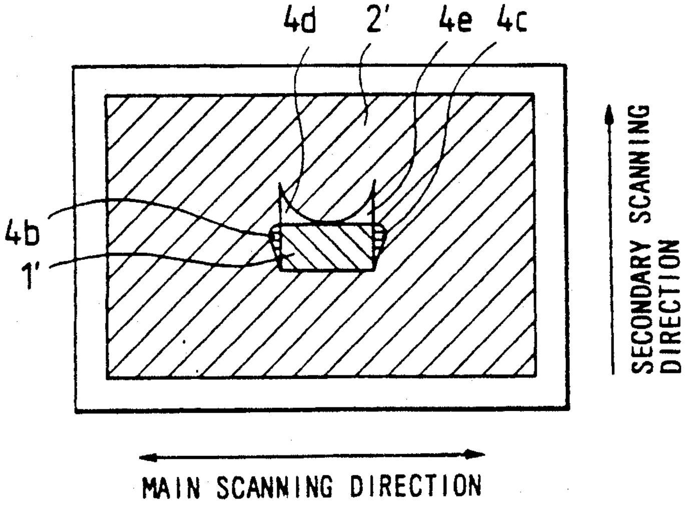
FIG. 9 PRIOR ART
Figure 10:
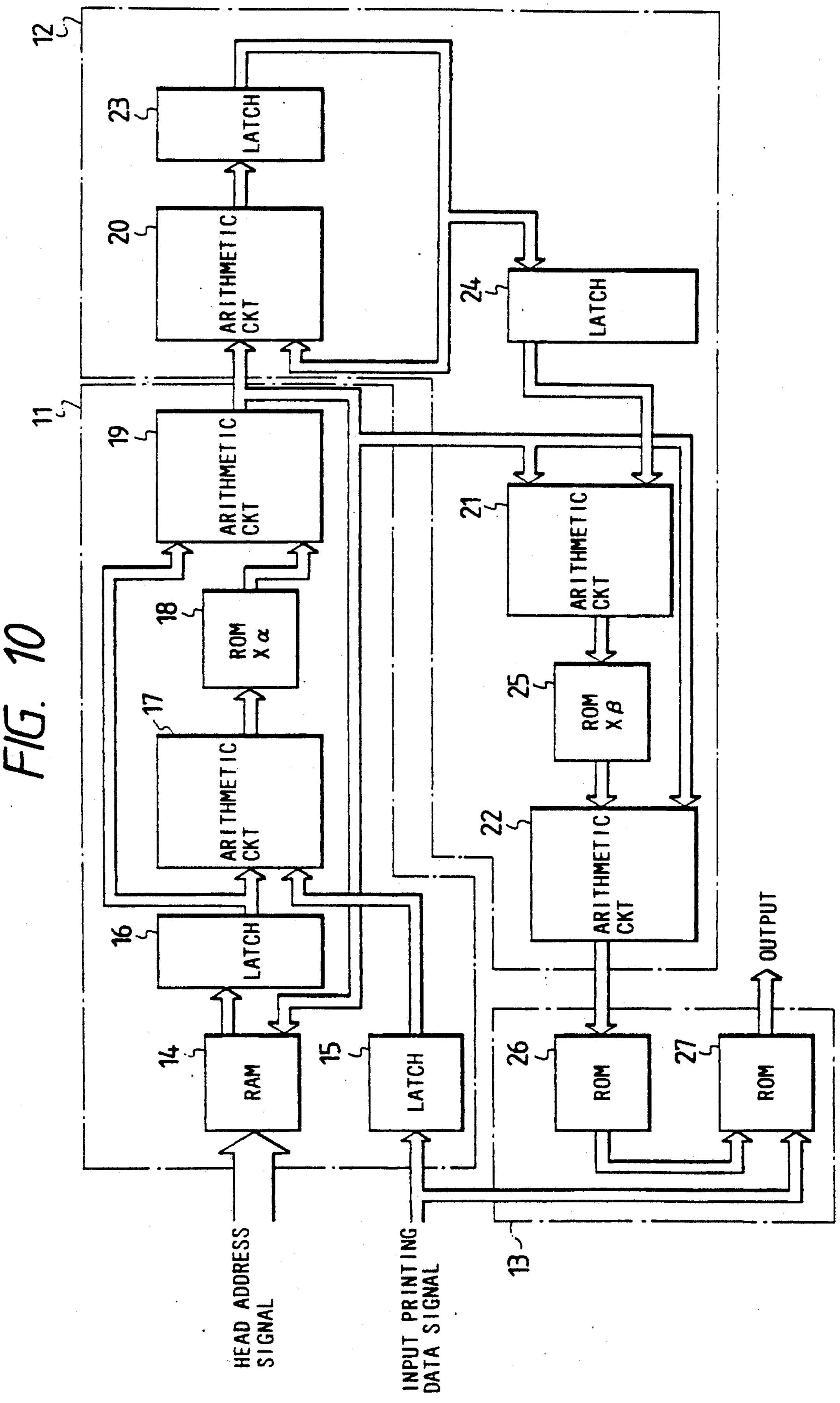
FIG. 10 is a block diagram showing an correction apparatus for correcting an input printing data signal to be supplied to a thermal head in a thermal printer according to a first embodiment.

Referring now to FIG. 10, there is illustrated a correction circuit according to a first embodiment of the present invention which is incorporated with a thermal printer. In FIG. 10, the correction circuit comprises an integration section 11 having an function for integrating a printing data signal to be supplied to each of heating elements (heat generating resistors each generating heat in response to a drive signal) of a thermal head so as to estimate the heat reserve effect in the secondary scanning direction of the thermal printer, an equalizing section 12 for taking an average of drive signals for one printing line so as to estimate the thermal affection between the respective heating elements in the main scanning direction on the basis of the averaged result, and a correction section 13 for correcting the printing data signal for each of the respective heating elements in accordance with the estimation results of the sections 11 and 12.

The integration section 11 receives a head address signal and a printing data signal from an external device. The head address signal represents the positions of the heating elements (dots) of the thermal head which are arranged successively in the main scanning direction. For example, in the case of the print head comprising 4096 heating elements, the address of heating element (leftmost heating element) positioned at one end of the heating element array is (000)h (hexadecimal), and the address of the heating element (rightmost heating element) positioned at the other end of the heating element array is (FFF)h (hexadecimal). The printing data signal designates the density of the printing effected by the heating element corresponding to each of the respective addresses. For example, in the case of digitizing the density of the original image with 7 bits, the printing data signal has a value corresponding to anyone between the maximum density (7F)h and the minimum density (00)h (no printing).

The head address signal is first inputted to a random hereinafter, stores the previous calculation value for each heating element. Here, the memory address of the RAM 14 are arranged in correspondance with the head address. For example, the calculation value for the heating element of the head address (000)h is stored in the memory cell of the RAM 14 address (000)h.

The calculation value read out from the RAM 14 is supplied through a latch circuit 16 to arithmetic units (each acting as a subtracter) 17 and 19. The arithmetic unit 17 is coupled to a latch circuit 15 which is responsive to the printing data signal from an external device so as to effect the subtraction between the calculation value from the RAM 14 and the input printing data signal latched in the latch circuit 15, the subtraction result being applied to a read-only memory (ROM) 18. The ROM 18 is for providing a predetermined coefficient, and in the cell of the ROM 18 address (XY)h is stored $\alpha$ x (XY)h which is a value obtained by multiplying the address by a coefficient ($\alpha$). For example, if the output of the arithmetic unit 17 is taken as (60)h, the ROM 18 outputs [$\alpha\times$ (60)h] which is stored in the address (60)h. This output of the ROM 18 is supplied to the arithmetic unit 19 so that the arithmetic unit 19 performs the subtraction between the the output of the ROM 18 and the previous printing data signal latched in the latch circuit 16, the subtraction result of the arithmetic unit 19 being supplied to the averaging section 12 and further supplied to the RAM 14 for storing.

Figure 11A:
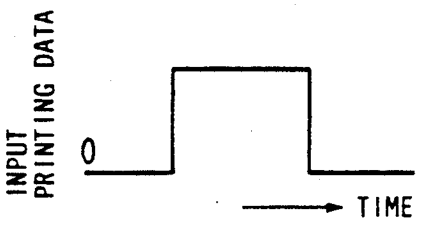
FIGS. 11A an 11B are waveform diagrams for describing the operation of the FIG. 10 apparatus.
Figure 11B:
Figure 12A:
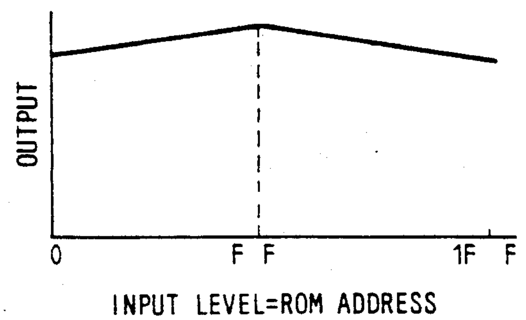
FIGS. 12A to 12D are graphic illustrations for describing the content of read-only memories used in the FIG. 10 apparatus.
Figure 12B:
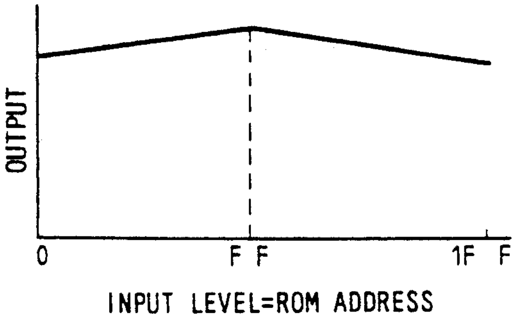

Let it be assumed that a line with a predetermined density is printed in the secondary scanning direction (recording medium feeding direction). In this case, at the print head address corresponding to the position of this line is applied a printing data signal as illustrated in FIG. 11A. Now, let it be assumed that this level is taken as 10. If the printing data signal is absent until printing this line, the value stored in the corresponding address of the RAM 14 is 0 and the output of the latch 16 is also 0. Thus, the arithmetic unit 17 results in the calculation of $0-10=-10$, which is used as a read address for reading out the ROM 18. If the coefficient corresponding to this value is ½, the output of the ROM 18 results in $-5$. The arithmetic unit 19 effects the subtraction between the value, i.e., 0, previously read out from the RAM 14 and the output of the ROM 18, thereby obtaining $0-(-5)=5$. Secondly, in response to input of the same address signal, the value read out from the RAM 14 becomes 5 and the printing data signal to be inputted is 10 as it is, and therefore the outputs of the arithmetic unit 17, ROM 18 and arithmetic unit 19 result in being $5-10=-5$, $-2.5$ and $5-(-2.5)=7.5$, respectively. By repeating the same calculation, the outputs of the arithmetic 19, i.e., the output of the integration section 11, vary as 5, 7.5, 8.75, . . . , thereby resulting in a signal as illustrated in FIG. 11B which signal substantially corresponds to the integration of the printing data signal. The configuration of the FIG. 11B signal depends upon the coefficient $\alpha$, and therefore, if selecting the coefficient $\alpha$ in accordance with the thermal time constant of the print head, the output of the integration section 11 shows the thermal state of the print head due to the input printing data signal. Further, if the coefficient $\alpha$ is the level function of the arithmetic unit 17, it is possible to perform the simulation with more accuracy. FIG. 12A shows one example thereof. In FIG. 12A, (FF)h on the horizontal axis corresponds to the case that the output of the arithmetic unit 17 is 0.

The output of the arithmetic unit 19, i.e., the signal integration-processed at each printing dot address in the integration section 11, is inputted in an arithmetic unit 20 of the equalizing section 12, the calculation result of the arithmetic unit 20 being led to a latch circuit 23. In the arithmetic unit 20, the input signal is added to the calculation result in the latch 23 until that time so as to perform the accumulation (integration) of the inputs. The contents of the latch circuit 23 is cleared at every one printing line, and the accumulation is performed section 11) corresponding to the print head address (000)h. The output of the latch 23 at the time of the termination of the accumulation for the one printing line becomes the sum total of the outputs of the integration section 11 for one printing line. The output of the latch 23 is led to a latch circuit 24, and at the time the bit shift is performed so that the value in the latch circuit 24 becomes an average value of the outputs for one printing line.

For example, let it be assumed that the bit numbers for the arithmetic unit 20, latch 23 and latch 24 are 20, 20 and 8, respectively. In supplying the result from the latch 23 to the latch 24, if the result in the latch 23 corresponding to 8, bits including the MSB (most significant bit) is supplied the latch 24, the contents of the latch 23 result in being shifted by 12 digits in the right direction, and hence the value obtained by the division by $2^{12}=4096$, i.e., the average value, is supplied to the latch 24.

Also included in the averaging section 12 is an arithmetic unit 21 which acts as a subtracter. The arithmetic unit 21 is coupled to the outputs of the latch 24 and the arithmetic unit 19 of the integration section 11 so as to obtain the difference between the output of the integration section 11 and the average value of the outputs for one printing line. Here, exactly speaking, although the average value used here is for the previous printing line, this is actually out of the question because of a great thermal inertia. The difference therebetween is multiplied by a predetermined coefficient 8 in a multiplication ROM 25 and supplied to an arithmetic unit 22 which effects the subtraction between the output of the multiplication ROM 25 and the output of the integration section 11. The subtraction result of the arithmetic unit 22 is led to the correction section 13. Here, as well as the above-mentioned ROM 18, the multiplication ROM 25 stores values obtained by multiplying the read addresses by the coefficient $\beta$.

Figure 13:
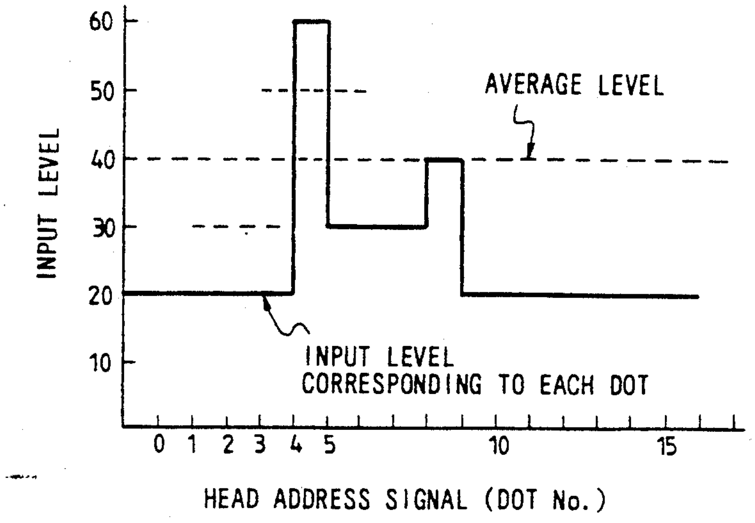
FIG. 13 is an illustration for describing the operation of the FIG. 10 apparatus.

When the output of the integration section 11 in the main scanning direction is as illustrated in FIG. 13, if the level of the average value kept in the latch 24 is 40, with respect to the head addresses 2 and 4, the processes in the steps from the arithmetic unit 21 to the arithmetic unit 22 are as follows under the condition of $\beta = \frac{1}{2}$.

| | Calculation in Unit 21 | | Calculation in ROM 25 | | Calculation in Unit 22 | Output |
|---|---|---|---|---|---|---|
| Add. 2: | $20-40=-20$ | → | $-20\times\beta=-10$ | → | $20-(-10)$ | $=30$ |
| Add. 4: | $60-40=+20$ | → | $20\times\beta=10$ | → | $60-10$ | $=50$ |

At a higher-level portion such as the head address 4, heat tends to run away to the circumference and hence its temperature is apt to become lower. On the other hand, at a portion whose level is below the average value, due to introduction from the circumference, its temperature tends to become higher. The above-described operation is for simulation of this condition. Here, the difference in the structure of the thermal head can be cancelled substantially by the coefficient $\beta$. In addition, if varying the coefficient $\beta$ in accordance with the level, the simulation can be effected with higher accuracy.

Figure 12C:
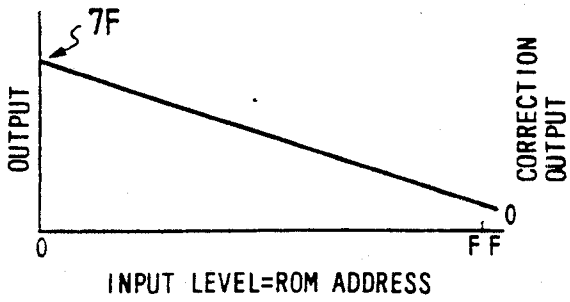

The correction section 13 comprises a ROM 26 and a ROM 27 so as to correct the printing data signal with reference to the output of the equalizing section 12 in accordance with a conversion table which is stored in the ROM 27. The output of the arithmetic unit 22 of the equalizing section 12 is first received by the ROM 26 of the correction section 13. The ROM 26 stores k times of the addresses in its memory cells corresponding to the read addresses. That is, the ROM 26 serves as a multiplier for multiplying a predetermined coefficient k. The object of ROM 26 is to provide a multiplying factor, and therefore, when the multiplying factor is 1, the ROM 26 is not required. FIG. 12C illustrates one example of the contents of the ROM 26.

Figure 12D:
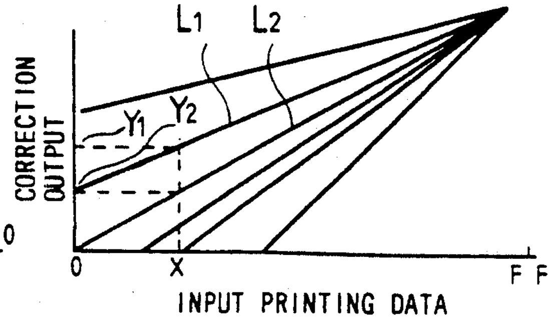

The ROM 27 stores a correction value of each printing data signal in a two-dimensional region based on line addresses and column addresses. The corrected printing data signal is derived from the ROM 27 with the inputted printing data signal being used as the line address and the output signal from the ROM 26 being used as the column address. Thus, the corrected printing data signal from the ROM 27 varies in accordance with the output signal of the ROM 26 even if the same printing data signal is inputted, as illustrated in FIG. 12D. In FIG. 12D, the horizontal axis represents the printing data signal, the vertical axis designates the corrected printing data signal and conversion lines (oblique lines) correspond to the signal levels from the ROM 26, respectively. The FIG. 12D shows one example in the case that the output of the ROM 26 is based on 7 bits and hence the number of the conversion lines is (7F)h=128. For example, if the input printing data signal is taken as X and the conversion line determined on the basis of the output of the ROM 26 is L1, the corrected printing data signal results in being Y1. If the conversion line is changed to L2 due to variation of the output signal of the ROM 26, the corrected printing data signal becomes Y2. Since as described above the output signal of the ROM 26 corresponds to the thermal state of the print head, the correction of the printing data signal in the ROM 27 can be effected in correspondance with the thermal state of the print head, thereby allowing the printing with high accuracy.

Figure 14:
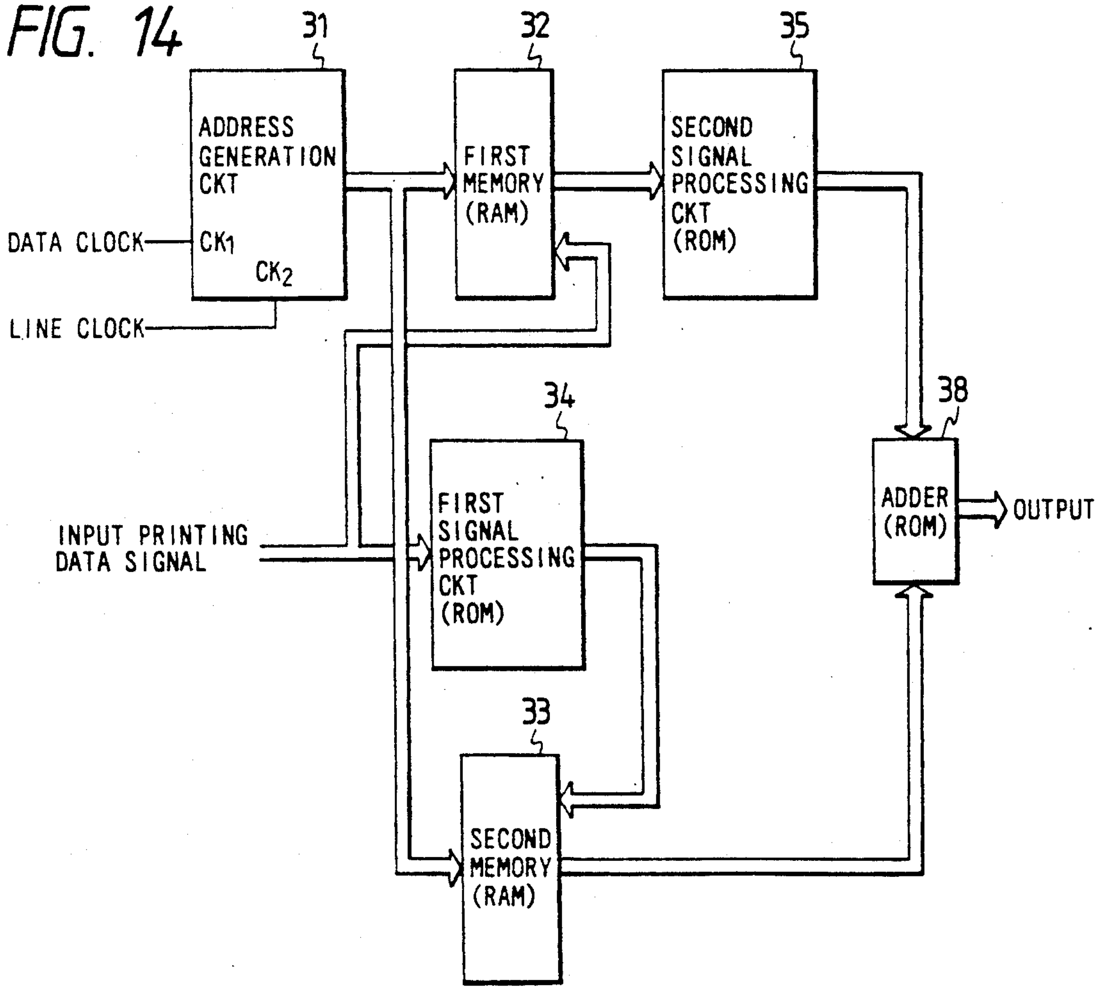
FIG. 14 is a block diagram showing a pre-correction apparatus according to a second embodiment of the present invention.

FIG. 14 is an illustration of a pre-correction apparatus of the printing data signal according to a second embodiment of the present invention. As mentioned before, it is desirable to correct the printing data signal corresponding to the thermal state of the print head in the main scanning direction. For this purpose, the pre-correction apparatus is used to correct beforehand the printing data signal inputted to the section 11 in the first embodiment. The pre-correction apparatus includes an address generation circuit 31 having clock input terminals ck1 and ck2, the input terminal ck1 receiving a data clock signal and the input terminal ck2 receiving a line clock signal. In the address generation circuit 31, the count direction for the generation of the address signal reverses at every one printing line. In other words, the address in the main scanning direction turns reversely. That is, if counting in the direction of 0→4096 when printing a given line, the counting on the next line is performed in the direction of 4096→0. This address is arranged to be in one-to-one corresponding relation to the dot address of the print head. The address signal from the address generation circuit 31 is supplied to a first memory 32 comprising a random access memory (RAM) and further to a second memory 33 comprising a read-only memory (ROM). The first and second memories 32 and 33 respectively have capacities for storing printing data corresponding to one printing line.

Figure 15:
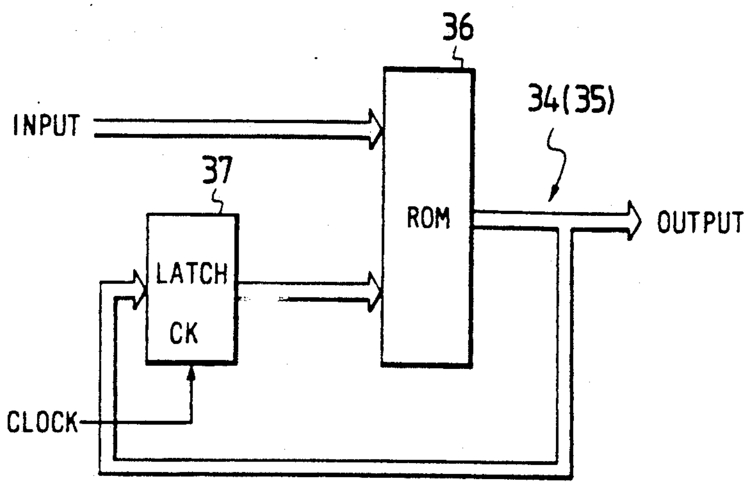
FIG. 15 is an illustration of an arrangement of a signal processing circuit used in the pre-correction apparatus.
Figure 16:
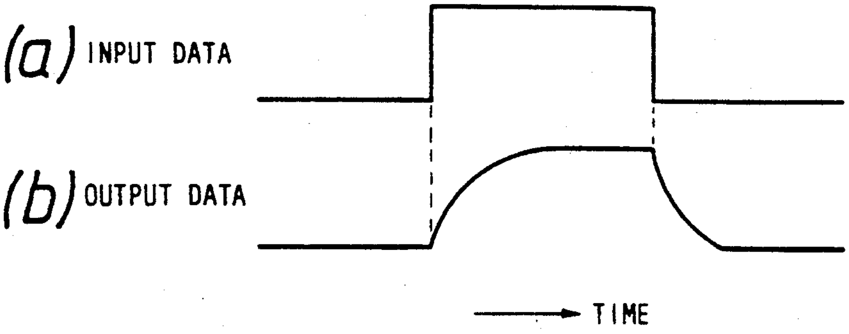
FIG. 16 shows an input signal and output signal of the signal processing circuit shown in FIG. 15.

Also included in the pre-correction apparatus are first and second signal processing circuits 34 and 35, the first signal processing circuit 34 receiving an input printing data signal supplied from an external circuit and the second signal processing circuit 35 being coupled to the output of the first memory 32. Each of the first and second signal processing circuits 34 and 35 is constructed as a low-pass filter (LPF) as illustrated in FIG. 15. That is, the low-pass filter includes a read-only memory (ROM) 36 and a latch circuit 37, the latch circuit 37 being coupled to the output of the ROM 36 so that the output thereof is supplied to the ROM 36. The ROM 36 has therein a conversion table and the waveform of the input signal thereto is changed in accordance with the conversion table when being outputted therefrom. Accordingly, when a signal as illustrated in (a) of FIG. 16 is inputted to the ROM 36, the waveform of the output signal of the ROM 36 is changed as illustrated in (b) of FIG. 16.

Figures 17A, 17B, 17C, 17D, 17E, 17F:
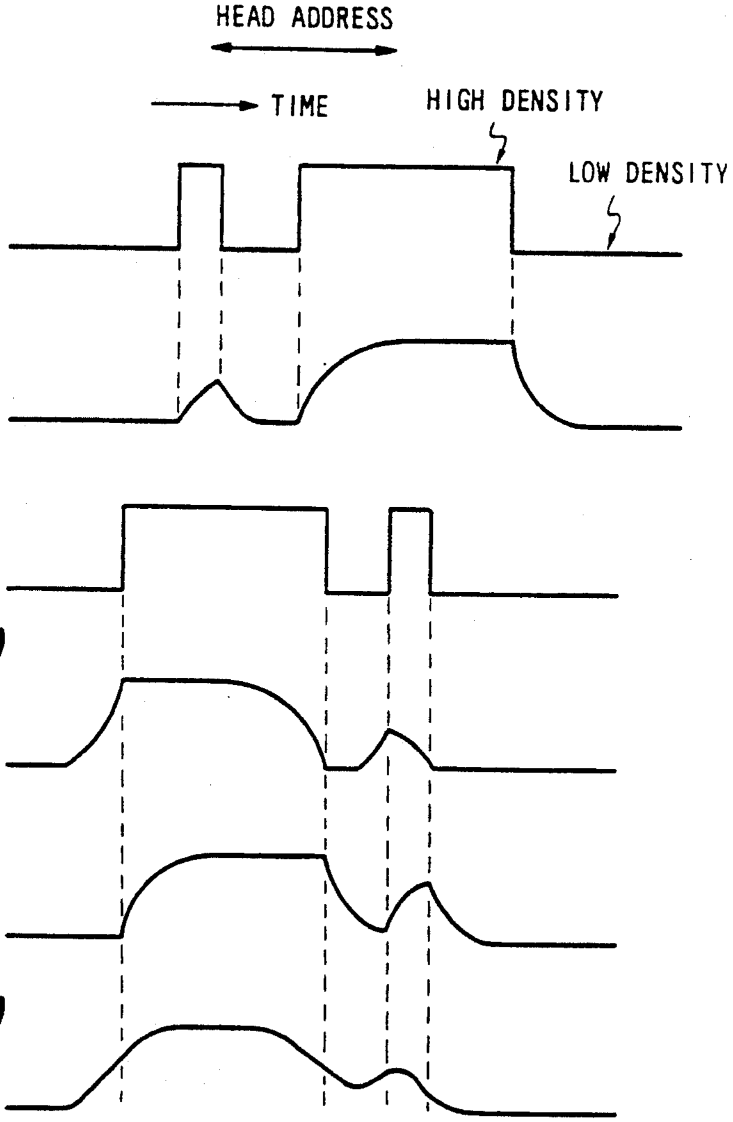
FIGS. 17(a) through 17(f) are timing charts for describing the operation of the pre-correction apparatus.

Operation of the pre-correction apparatus will be described hereinbelow with reference to FIGS. 17(a) through 17(f), which are timing charts showing waveforms of signals at portions of the pre-correction apparatus. The horizontal axis represents the head address. When an input printing data signal as illustrated in FIG. 17(a) is supplied to the first memory 32 and further to the first signal processing circuit 34, the first memory 32 stores this input printing data signal, and the first signal processing circuit 34 outputs a signal as illustrated in FIG. 17(*b*) (because the first signal processing circuit 34 acts as a low-pass filter as described above), which signal is in turn supplied to the second memory 33 and stored therein. Here, in response to change from the current printing line to the next printing line, the output (address signal) of the address generation circuit 31 turns reversely. Thus, the data are read from the first and second memories 32 and 33 in the address direction opposite to the direction on the writing and become as shown in FIG. 17(*c*) and (*d*), respectively. After the reading, data for the next printing line are written in the first and second memories 32 and 33.

The output of the first signal processing circuit 34 is supplied to the second memory 33 and the output of the second memory 33 (the data read out in accordance with the output of the address generation circuit 31) is supplied to an adder 38. The data signal (c) of FIG. 17(*e*) head from the first memory 32 is inputted into the second signal processing circuit 35, and the output of the second signal processing circuit 35 is inputted into the adder 38. Here, as well as the output of the first signal processing circuit 34, the output of the second signal processing circuit 35 results the waveform as illustrated by FIG. 17(*e*). Further, a data signal as illustrated at FIG. 17(*d*) is read from the second memory 33 in the address direction opposite to the direction on the writing and inputted to the adder 38.

The adder 38 takes the sum of the output of the second memory 33 and the output of the second signal processing circuit 35 and reduces the sum by half. More specifically, the adder 38 comprises a read-only memory (ROM) having a two-dimensional table which is made with the outputs of the second memory 33 and second signal processing circuit 35 being used as the input address so as to reduce the sum of the outputs thereof by half. For example, when the line address is (1E)h=30 and the column address is (10)h=16, in the corresponding memory cell is stored (30+16)/2=33. Here, the output of the adder 38 designates the thermal state (thermal reserving state) of the print head. Thus, an adequate correction printing data signal shown in FIG. 17(*f*), taking into account the thermal state of the thermal head in the main scanning direction, can be obtained by effecting the correction of the input printing data signal on the basis of the output of the adder 38. Moreover, if, for example, the output of the adder 38 is supplied to the section 11 in the first embodiment described above with reference to FIG. 10, the input printing data signal can additionally be corrected on the basis of the thermal state of the thermal head in the secondary scanning direction.

The output signal of the adder 38 is in the order-reversed relation to the input printing data signal (a) of FIG. 17(*a*). If this causes a problem, a RAM-constructed memory may additionally be provided in order to first store the input printing data signal. The stored input printing data signal is read therefrom in response to the output of the address generation circuit 31 so as to supply it to the first memory 32 and the first signal processing circuit 34, whereby the output of the adder 38 corresponds in order to the input printing data signal. In this case, the additionally providing memory is coupled to the address generation circuit 31 as well as the first and second memories 32 and 33.

Figures 18, 19A, 19B:
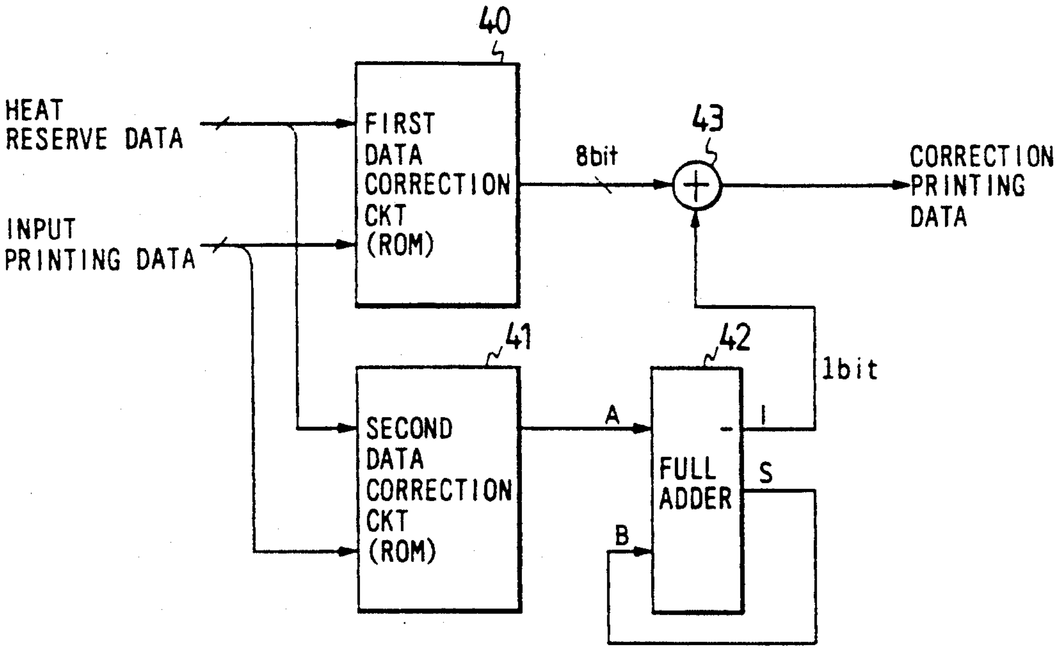
FIG. 18 is a block diagram showing a correction apparatus according to a third embodiment of the present invention.
FIGS. 19A and 19B are illustrations of the contents of read-only memories used in the FIG. 18 apparatus.

A third embodiment of the present invention will be described hereinbelow with reference to FIG. 18 which shows a correction section corresponding to the correction section 13 in the above-mentioned first embodiment of this invention. The FIG. 18 correction section includes first and second data correction circuits 40 and 41 each of which receives an input printing data signal and an estimation result of the thermal state of the print head from external circuits. The first data correction circuit 40 comprises a numerical conversion read-only memory (ROM) storing a predetermined two-dimensional table as illustrated in FIG. 19A and is arranged to effect the correction of the input printing data signal corresponding to each of the respective dots to be printed by the print head, on the basis of the heat reserve signal in accordance with the two-dimensional table stored in the ROM so as to output data representing the portion above the decimal point of the correction value. On the other hand, the second data correction circuit 41 comprises a numerical conversion read-only memory (ROM) storing a predetermined two-dimensional table as illustrated in FIG. 19B and is arranged to effect the correction of the input printing data signal corresponding to each of the respective dots to be printed by the thermal head, on the basis of the heat reserve signal in accordance with the two-dimensional table stored in the ROM so as to output data representing the portion below the decimal point of the correction value. The output of the second data correction circuit 41 is supplied to a full adder 42, which addes the output (the correction data corresponding to the portion below the decimal point) A of the second data correction circuit 41 to the feedback data B from the full adder 42. The feedback data B corresponds to the portion below the decimal point of the sum S of the output data A of the second data correction circuit 41 and the feedback data B (S =A+B). Here, if the calculation results in the carry so as to generate data above the decimal point, the full adder 42 first outputs the data (1) generated due to the carry. The output data (1) of the full adder 42 is supplied to an adder 43 which also receives the output of the first data correction circuit 40. The adder 43 adds the output data (1) of the full adder 42 to the output data (correction data corresponding to the portion above the decimal point) of the first data correction circuit 40 so as to output the addition data, as the correction input printing data signal, to the thermal head. That is, in the case of no generation of the carry in the full adder 42, the adder 43 directly outputs the output data from the first data correction circuit 40. Further, in the case of the generation of the carry in the full adder 42, the adder 43 outputs the data obtained by adding the output data (1) of the full adder 42 to the output data of the first data correction circuit 40.

Figure 20:
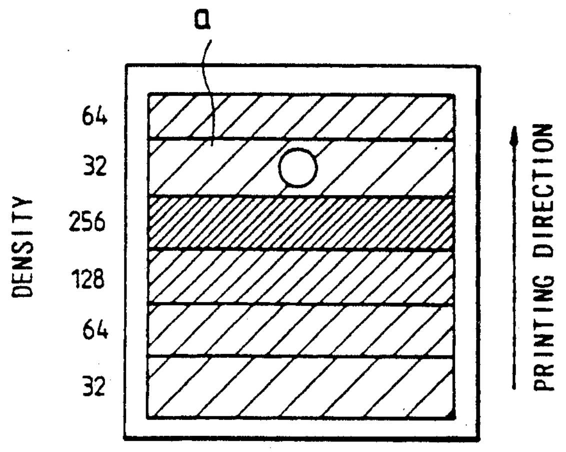
FIG. 20 shows an original image to be printed by a thermal printer.
Figure 21:
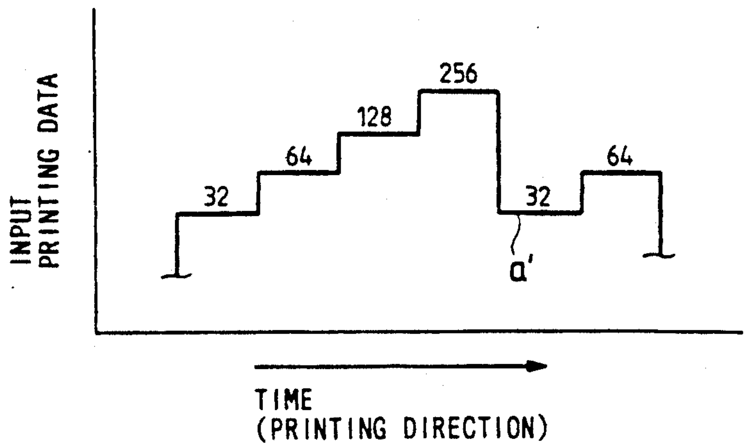
FIG. 21 shows a printing data signal corresponding to the FIG. 20 original image.
Figure 22:
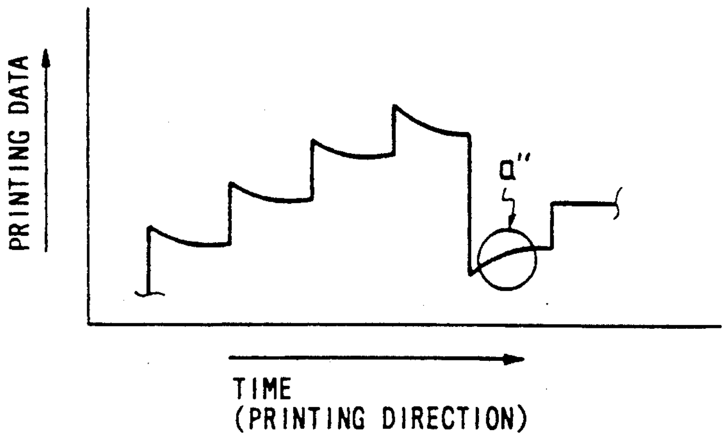
FIGS. 22 to 25 are illustrations for describing the operation of the FIG. 18 apparatus.

Here, let it be assumed that an input printing data signal, shown in FIG. 21, corresponding to an image as illustrated in FIG. 20 is supplied to the first and second data correction circuits 40 and 41. In FIGS. 20 and 21, a portion of the FIG. 20 image illustrated by a corresponds to a portion of the FIG. 21 input printing data signal illustrated by a'. In response to the input of the FIG. 21 printing data signal, the first data correction circuit 40 is expected to output a correction printing data signal as illustrated in FIG. 22. However, a portion illustrated by a'' (corresponding to the portion a' in FIG. 21) in FIG. 22 has a stepwise configuration as shown by a solid line in FIG. 23. This is due to the digital processing of the first data correction circuit 40.

Figure 23:
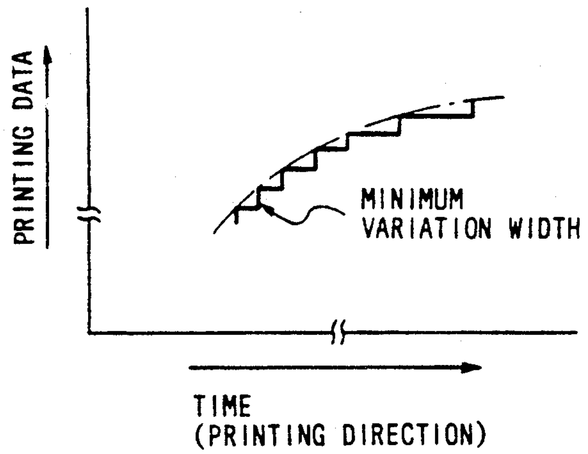
Figure 24:
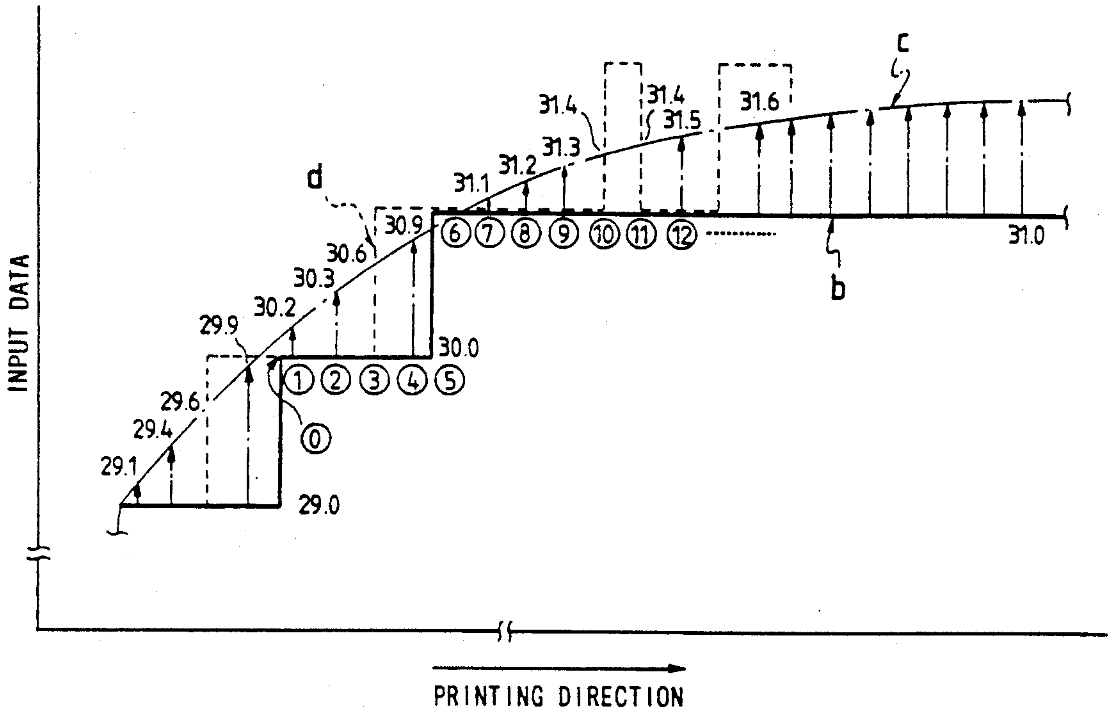

Operation of this third embodiment will be described hereinbelow with reference to FIG. 24 which is an enlarged illustration of the portion illustrated in FIG. 23. In FIG. 24, a solid line b represents the actual output of the first data correction circuit 40 and a dotted line d designates the output of the adder 43 obtained by the correction. In this embodiment, the second data correction circuit 41 is arranged so as to output the differences (whose magnitudes are indicated by lengths of arrows) between the solid line b and an alternate long and short dash line c. The differences correspond to the data below the decimal point.

In FIG. 24, since the output of the first data correction circuit 40 from a point ⓪ to a point ⑤ is 30, the output of the second data correction circuit 41 at a point ① becomes 0.2 (30.2−30.0=0.2), and when the feedback data B from the full adder 42 is taken as 0, the full adder 42 in turn outputs 0.2 as the feedback data. In the second stage, since the feedback data B of the full adder 42 is changed to be 0.2, the to in the main scanning direction, the output of the adder 42 becomes 0.4 (0.2+0.2 =0.4) Thus, in the third and fourth stages, the outputs of the adder 43 result in being 0.6 and 0.8, respectively. In the fifth stage, the output of the full adder 42 reaches 1.0 (0.8+0.2=1.0), and therefore the full adder 42 outputs 1 to the adder 43 due to the carry. In response to the output of the full adder 42, the output of the adder becomes 31 (30.0+1.0=31) so as to set the output of the full adder 42 to 0.2 (0.2 + 0.0). Accordingly, at the position ①, the output of the adder 43 becomes 31 at every five dots in the main scanning direction in the rate of two per ten dots in the main scanning direction.

At the position ②, the output of the first data correction circuit 42 is 30 and the output of the second data correction circuit 41 becomes 0.3 (30.3 − 30.0). Thus, with respect to each dot in the main scanning direction, the output of the full adder 42 is changed as 0.3 (30.3 + 0.3), 0.6 (0.3 + 0.3), 0.9 (0.6 + 0.3), 1.2 (0.9 + 0.3), 0.5 (0.2 + 0.3), 0.8 (0.5 + 0.3), 1.1 (0.8 + 0.3) and 0.4 (0.1 + 0.3). For the fourth dot and seventh dots in which the outputs of the full adder 12 exceed 1, the output of the adder 43 becomes 31. That is, at the position ②, three of 10 dots results in 31. Further, at the position ③, since the output of the second data correction circuit 41 is 0.6, the output of the full adder 42 is changed as 0.6 (0 + 0.6), 1.2 (0.6 + 0.6), 0.8 (0.2 + 0.6), 1.4 (0.8 + 0.6), 1.0 (0.4 +0.6), 0.6 (0 + 0.6), 1.2 (0.6 + 0.6). Accordingly, the output of the adder becomes 31 in the rate of six per 10 dots in the main scanning direction. Still further, at the position ④, the output of the second data correction circuit 41 is 0.9, and as a result the output of the adder 43 becomes 31 in the rate of nine per ten dots.

On the other hand, at the positions ⑤, ⑥, the output of the first data correction circuit 40 becomes 31 and the output of the second data correction circuit 41 is 0.0. In this case, due to no carry, all the outputs of the adder 43 become 31 which is the output of the first data correction circuit 40. Further, at the position ⑦, the output of the second data correction circuit 41 becomes 0.1, and therefore the output of the adder becomes 32 in the rate of one per ten dots in the main scanning direction.

Figure 25:
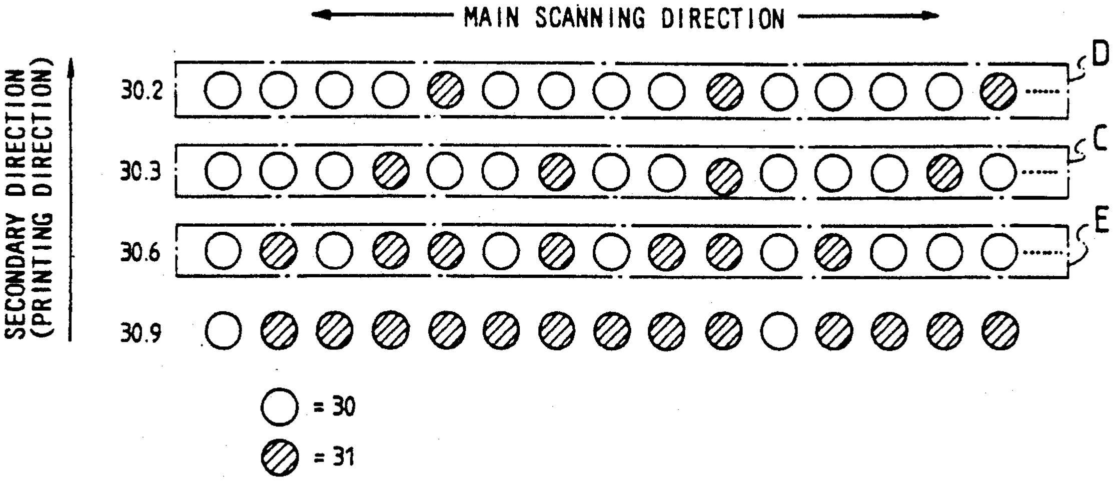

With successive execution of the above-mentioned process, the adder can output, as the correction input printing data signal, signal having a waveform as illustrated by the dotted line d in FIG. 24. If taking an average of the correction input printing data in the main scanning direction, the averaged correction input printing data signal is approximated to the ideal correction printing data signal as illustrated by the alternate long and short dash line c, thereby substantially eliminating density variation due to the digital processing. FIG. 25 shows the density distribution of dots printed according to this embodiment which corresponds to the positions ①, to ④ in FIG. 24. In FIG. 25, bright-circles represent dots whose printing densities are 30 and dark-circles designates dots whose printing densities are 31 and C to D depict dot trains in the main scanning direction.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in this embodiment the correction data outputted from the second data correction circuit 41 is one figure below the decimal point, it is also appropriate to use two or more figures below the decimal point.

What is claimed is:

1. A data correction apparatus for correcting a printing data signal to be supplied to a thermal printer having a printing head constructed with heating elements aligned in a main scanning direction, comprising:

estimation means for estimating a thermal state of said printing head being supplied with said printing data signal, including, integration means for integrating said printing data signal corresponding to each of a plurality of dots to be printed by said printing head, equalizing means for averaging an output of said integration means in one main scanning period and for equalizing an output level of said integration means to a level of an averaging result provided thereby, pre-correction means for correcting beforehand said printing data signal inputted to said integration means, said pre-correction means comprising:

first data processing means for integrating said printing data signal successively in one direction on a time axis;

second data processing means for integrating said printing data signal successuvely in a second direction opposite to said one direction on the time axis; and third data processing means for averaging outputs of said first and second processing means; and correction means for correcting a level of said printing data signal in response to an output of said estimation means.

2. A correction apparatus for correcting a printing data signal to be supplied to a print head in a thermal printer, in response to a reference signal indicative of a thermal state of the print head simulated by the printing data signal, comprising:

first correction means for correcting said printing data signal in response to a portion above decimal point of said reference signal;

second correction means for correcting said printing data signal in response to a portion below the decimal point of said reference signal;

first adder means for accumulating an output of said second correction means and for outputting an extra signal every carry; and second adder means for adding outputs of said first correction means and said first adder means and for outputting a result of the addition as a corrected printing data signal.

* * * * *